US012789882B2

(12) United States Patent
Faulkner et al.

(10) Patent No.: US 12,789,882 B2
(45) Date of Patent: Nov. 10, 2026

(54) BREAKAWAY DEVICE FOR AN AUTOMOTIVE STEERING COLUMN

(71) Applicant: NSK Steering Systems America, Inc., Ann Arbor, MI (US)

(72) Inventors: Thomas Faulkner, Ann Arbor, MI (US); Karina Navarrete, Ann Arbor, MI (US); Logananth Chinniah, Ann Arbor, MI (US)

(73) Assignee: NSK STEERING SYSTEMS AMERICA, INC., Ann Arbor, MI (US)

( * ) Notice: Subject to any disclaimer, the term of this patent is extended or adjusted under 35 U.S.C. 154(b) by 0 days.

(21) Appl. No.: 19/129,819

(22) PCT Filed: Dec. 1, 2023

(86) PCT No.: PCT/US2023/082048
§ 371 (c)(1),
(2) Date: May 14, 2025

(87) PCT Pub. No.: WO2024/123610
PCT Pub. Date: Jun. 13, 2024

(65) Prior Publication Data

US 2026/0184364 A1 Jul. 2, 2026

Related U.S. Application Data

(60) Provisional application No. 63/430,787, filed on Dec. 7, 2022.

(51) Int. Cl.
*B62D 1/19* (2006.01)
*B62D 1/184* (2006.01)

(52) U.S. Cl.
CPC ............. *B62D 1/192* (2013.01); *B62D 1/184* (2013.01)

(58) Field of Classification Search
CPC ........ B62D 1/192; B62D 1/184; B62D 1/185; B62D 1/183; B62D 1/187; B62D 1/19; B62D 1/195; B62D 1/16; B62D 1/18
See application file for complete search history.

(56) References Cited

U.S. PATENT DOCUMENTS 6,467,807 B2 10/2002 Ikeda et al.
11,440,578 B2 9/2022 Dubay et al.
(Continued)

FOREIGN PATENT DOCUMENTS

DE 102019219112 A1 6/2020
WO WO-2018064161 A1 * 4/2018 ............ B62D 1/195

OTHER PUBLICATIONS

International Search Report and Written Opinion dated Mar. 26, 2024, for International Application PCT/US2023/082048.
(Continued)

*Primary Examiner* — Jason D Shanske
*Assistant Examiner* — Matthew Joseph Ganci
(74) *Attorney, Agent, or Firm* — The Dobrusin Law Firm, P.C.

(57) ABSTRACT

An energy absorption assembly (50) for a steering column assembly including an energy absorption plate (52), a gear plate (60), and a breakaway bracket (80). The energy absorption plate (52 may include a first end and a second end with a curved portion therebetween. The gear plate (60) may engage and/or disengage with a locking mechanism. The energy absorption plate (52) may be attached to the gear plate (60) at or near an end of the gear plate (60). The breakaway bracket (80) may be attached to the gear plate (60) at or near an opposing end of the gear plate (60).

20 Claims, 4 Drawing Sheets

(56) References Cited

U.S. PATENT DOCUMENTS

| | | | | |
|---|---|---|---|---|
| 2010/0300238 | A1 | 12/2010 | Ridgway et al. | |
| 2012/0043746 | A1* | 2/2012 | Welker | F41H 7/046<br>280/779 |
| 2013/0233117 | A1 | 9/2013 | Read et al. | |
| 2016/0121920 | A1* | 5/2016 | Klepp | B62D 1/195<br>74/492 |
| 2016/0368524 | A1* | 12/2016 | Tinnin | B62D 1/192 |
| 2020/0398885 | A1* | 12/2020 | Pichonnat | B62D 1/192 |
| 2021/0394816 | A1* | 12/2021 | Mathur | B62D 1/192 |
| 2022/0048555 | A1 | 2/2022 | Park | |

OTHER PUBLICATIONS

German Office Action, dated Jun. 30, 2026, for German Application No. 11 2023 005 117.8.

* cited by examiner

BREAKAWAY DEVICE FOR AN AUTOMOTIVE STEERING COLUMN

CLAIM OF BENEFIT OF FILING DATE

The present application claims the benefit of the filing date of U.S. Provisional Application No. 63/430,787, filed Dec. 7, 2022, the content of which is hereby expressly incorporated by reference in its entirety for all purposes.

FIELD

In general, the present teachings relate to an improved collapsible steering column assembly and methods associated with the same. More particularly, the present teachings are directed to an internal collapsing tilt and/or telescopically adjustable steering column system having an energy absorption assembly adapted to absorb energy in the event of an impact exceeding a threshold load.

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column or portions thereof may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

Some current assemblies have an energy absorption plate or strap in an energy absorption assembly. Some assemblies have a breakaway feature or device that requires the use of attachment features located within the deformation range of the energy absorption plate or strap. Features in this region may affect the collapse load of the column.

While existing designs may operate for their intended purposes, there is still a need for different packaging of a breakaway device relative to an energy absorption plate. There is a need for adding more space between the deformation region and the breakaway device. There is a need for the ability to add geometry required to ensure the breakaway features break in a controlled shear to provide added predictability. Predictability may be important, as bending failure, tensile failure, or a combination of shear, bending, and tension may be difficult to predict and/or control. As an example, U.S. Pat. No. 11,440,578 shows a rivet through the deformable portion of the energy absorption strap. This positioning compromises the force displacement profile of the steering column. In addition, the rivet does not have any features to generate a shear failure, so it is likely to fail in a bending/tensile mode. Therefore, alternate constructions are needed.

SUMMARY

The present teachings make use of a simple, yet elegant, construction approach by which relatively few components can be employed for achieving a steering column assembly, such as a collapsible steering column assembly. The steering column assembly may be an adjustable (e.g., for rake and/or reach) steering column assembly. For example, though having applicability to externally collapsing assemblies (which are contemplated within the present teachings), the steering column assembly herein may be an internally collapsible assembly. It may be an assembly that is affixed within a vehicle at one or more fixation points so that upon a secondary impact the steering column assembly resists forward motion substantially beyond (e.g., about 10 mm or more or about 20 mm or more beyond) the one or more fixation points. It may be a collapsible steering column assembly that exhibits relatively good energy absorption characteristics, especially during a secondary impact. It may be a collapsible steering column assembly that exhibits longitudinal displacement (e.g., forward translation) of one or more components of the assembly (e.g., a column tube) during a secondary impact.

Within the present teachings, there is envisioned a collapsing steering column assembly having any combination of the following features in the following paragraphs. It may be an internally collapsing assembly or an externally collapsing assembly. Though, it is particularly attractive for an internally collapsing assembly in which at least a portion of the assembly is secured against any substantial forward movement (e.g., about 50 mm or less, about 20 mm or less, or about 10 mm or less) within a vehicle. The steering column assembly may include a steering wheel position adjustment portion (e.g., an arrangement adapted for adjusting the rake and/or reach position of a steering wheel relative to a vehicle operator, such as a telescoping tubular arrangement). It may include one or more brackets for at least partially carrying the steering wheel position adjustment portion and/or attaching the assembly within the vehicle. It may include a securing member (e.g., as discussed elsewhere herein, a tilt bolt or other elongated member, such as one that is adapted for applying a securing force to help maintain a steering column assembly in a desired position) for fixing the position of the steering wheel position adjustment portion (such as by operation of a lever that is adapted to be employed by an operator to apply or remove a securing force). During normal operation, the steering column assembly may be in a secure engagement position, where at least a portion of the steering shaft support structure (e.g., a column tube, a column housing, or both) is fixed in a fixed position in the steering column assembly. The secure engagement position may be the adjusted position selected by the user in an adjustable position steering column assembly.

The present teachings contemplate an energy absorption assembly for a steering column assembly. The energy absorption assembly may include an energy absorption plate, a gear plate, a breakaway bracket, or any combination.

The energy absorption assembly may include an energy absorption plate. The energy absorption plate may have a first end and a second end, with a curved portion therebetween. The energy absorption plate may be operatively coupled to a column tube of the steering column assembly. The energy absorption plate may be coupled to a column tube via one or more fasteners, such as rivets. The rivets may be non-shear rivets.

The energy absorption assembly may include a gear plate. The gear plate may be adapted to engage and/or disengage with a locking mechanism. A gear plate may be integrally formed with the energy absorption assembly (e.g., forming a single piece). A gear plate may be separate from the energy absorption plate. The gear plate and the energy absorption plate may be formed of different materials, different strengths (e.g., tensile strength), different thicknesses, or a combination thereof. The energy absorption plate may be attached to and/or extend from the gear plate (e.g., at or near an end of the gear plate). A fastener may join the energy absorption plate and the gear plate at a junction. A slot may be located at the junction between the gear plate and the energy absorption plate (e.g., in the energy absorption plate, in the gear plate, or both). The gear plate may have a generally planar surface. The gear plate may be configured to be positioned generally parallel to the surface of a column tube of the steering column assembly. The gear plate may include a toothed surface adapted to engage with a locking pin to put the steering column assembly in a desired orientation (e.g., a desired telescoping position).

The energy absorption assembly may include a breakaway bracket. The breakaway bracket may include one or more features that engage with or secure the breakaway bracket to another portion of the steering column assembly. The breakaway bracket may be attached to a column tube (e.g., during normal operation or prior to an impact exceeding a threshold load). The breakaway bracket may engage with one or more openings in a column tube (e.g., during normal operation or prior to an impact exceeding a threshold load). The breakaway bracket may include a column tube pin that is adapted to be received within an opening of a column tube. The breakaway bracket may be attached to the gear plate (e.g., at or near an opposing end of the gear plate from the energy absorption plate). The breakaway bracket may include one or more gear plate anchors for engaging with a portion of the gear plate. The gear plate may include an opening for receiving the gear plate anchor or a portion thereof. The gear plate anchor may engage with the opening in the gear plate via one or more wings or tabs. The gear plate anchor may, for example, connect to the gear plate via snap fit. The breakaway bracket may include a slot for receiving and engaging with a portion of a gear plate.

The breakaway bracket may be configured to couple an end of the energy absorption plate to a column tube of the steering column assembly during normal operation. The breakaway bracket may be configured to decouple the breakaway bracket from the column tube when an input load exceeds a threshold load. The threshold load may be about 250 N or more, about 350 N or more, about 500 N or more, about 600 N or more, or about 800 N or more. The threshold load may be about 10,000 N or less, about 8000 N or less, about 6000 N or less, about 5000 N or less, or about 1000 N or less.

The present teachings also contemplate an assembly for a steering column assembly including the energy absorption assembly and a column tube. The gear plate may be selectively attached to the column housing through an adjustment subassembly of the steering column assembly (e.g., a telescope positive lock mechanism). An energy absorption plate may be secured to the column tube by one or more fasteners. The fasteners may be rivets, such as non-shear rivets. The breakaway bracket my include a column tube pin extending form the breakaway bracket and received within the column tube (e.g., an opening in the column tube). The breakaway bracket may be secured to the column tube via one or more fasteners. Fasteners may be rivets, such as shear rivets. The breakaway bracket may include one or more fasteners, one or more column tube pins, or a combination thereof. Upon an impact exceeding a threshold load (e.g., a load of about 500 N or more, about 6000 N or less, or both) the breakaway bracket may break away from the column tube while the energy absorption plate remains secured to the column tube. The column tube pin, shear rivets, or combination thereof may shear to allow the breakaway bracket to break away from the column tube. Alternatively or additionally, it is contemplated that the breakaway bracket can be secured to the column tube using one or more fasteners, such as a non-shear rivet. The gear plate anchor can be arranged such that the breakaway bracket separates from the gear plate upon an impact load exceeding a threshold load.

The present teachings also contemplate a steering column assembly including any combination of features, including but not limited to, a column tube; a steering shaft supported for rotation at least in part by the column tube; a bracket for at least partially carrying the column tube; an adjustment subassembly; and the energy absorption assembly as described herein. The adjustment subassembly may be adapted for selectively adjusting the steering shaft, column tube, or both, in a fore or aft direction generally along the longitudinal axis. The adjustment subassembly may be adapted for selectively raising or lowering the steering shaft, column tube, or both.

As can be seen, it is thus possible to realize a unique assembly (and associated methods) that enable a steering column assembly to adjust (e.g., tilt, telescope, or both), that ease assembly, reduce the number and/or size of necessary parts, that provide for energy absorption and/or breakaway during an impact exceeding a threshold load, or a combination thereof.

DETAILED DESCRIPTION

Figure 1:
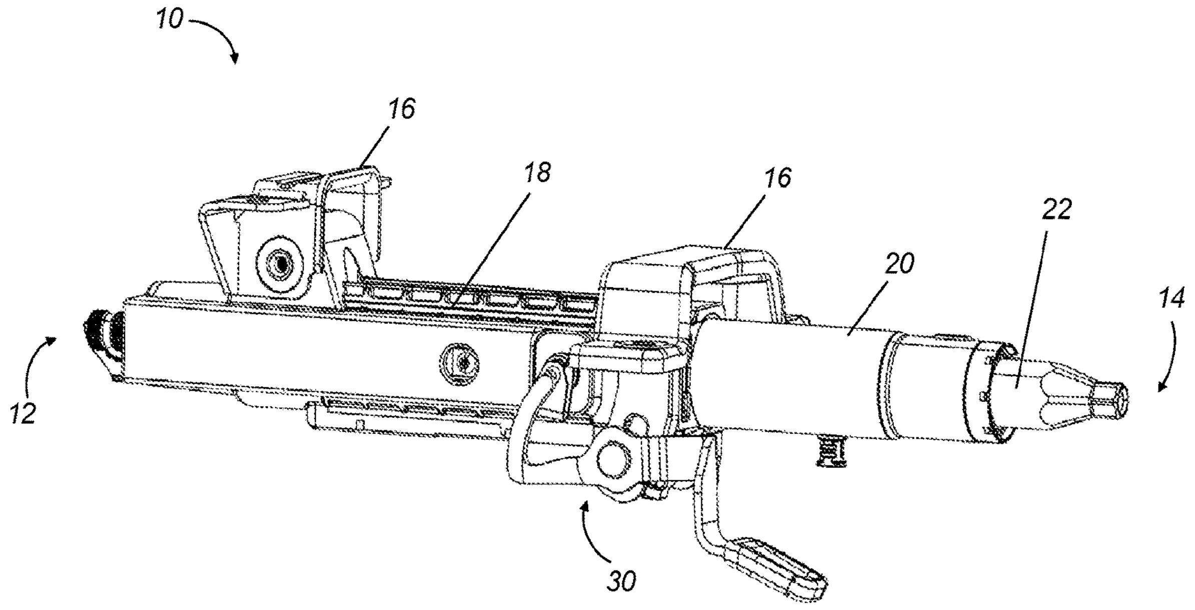
FIG. 1 is a side perspective view of an illustrative steering column assembly in accordance with the present teachings.

As required, details of the present teachings are disclosed herein; however, it is to be understood that the disclosed teachings are merely examples that may be embodied in various and alternative forms. The figures are not necessarily to scale; some features may be exaggerated or minimized to show details of particular components. Some features may be omitted for clarity or otherwise. Therefore, specific structural and functional details disclosed herein are not to be interpreted as limiting, but merely as a representative basis for teaching one skilled in the art to variously employ the present teachings.

The present teachings may include features of the steering column assembly (e.g., a positive lock assembly) of U.S. Publication No. 2021/0394816, the contents of which are expressly incorporated by reference in its entirety for all purposes herein.

In general, and as will be appreciated from the description that follows, the present teachings pertain to a steering column assembly. The steering column assembly may include a mounting portion for securing the steering column assembly in a vehicle in a fixed operational position. The assembly may have a collapsing and/or telescoping portion, at least a portion of which is adapted to travel forward relative to the mounting portion, while the mounting portion stays generally in its fixed operational position (e.g., any travel of the mounting portion may be controlled and/or limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 6 kN or less), may be adapted so that at least a portion of the collapsing portion travels forward within the vehicle. The forward travel may be in a telescopic manner (e.g., at least one first structure that is operatively connected to a steering wheel (such as a column tube) may advance forward (e.g., along an axis that is generally parallel with (such as within about 10° of being parallel with) a vehicle longitudinal axis) in a vehicle relative to at least one second structure that may at least partially surround the at least one first structure (e.g., a column housing)).

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. In particular, with respect to adjustment of the tilt of the assembly, securing may be realized by a suitable securing member (e.g., an elongated force applying member), such as a bolt (e.g., a tilt bolt), rod, strap, bar, band, wedge, cam, or other suitable member, or a combination thereof. For instance, the securing member may be adapted, upon actuation of the user operating device to cause a cam or rotational member to rotate and engage with a wall of a tilt plate to secure the steering wheel at its desired angle. Upon actuation of the user operating device, a pin may be brought out of or pushed into engagement with one or more engagement features (e.g., toothed portion, shape complementary to the pin, or one or more openings) located on or attached to a column tube, allowing for telescoping adjustment.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube (e.g., each may have a longitudinal axis that is generally parallel or even coaxial with each other). One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate and/or adjust the assembly. An electromechanical device that applies or releases a force in response to a signal from an operation switch may be employed. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user.

The teachings address an assembly that may typically include a column tube, a steering shaft, a bracket, a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is contemplated that a lever may be used to cause a tilt or telescoping function, while a motor or other electromechanical actuator may be used to cause the other of the tilt or telescoping function. At least one engagement member (e.g., a pin) may be brought into and out of engagement with the column tube or a structure secured thereto for selectively locking the steering shaft into a position (e.g., telescoped position) desired by a user (e.g., via the lever). One or more rotational members may be brought into and out of engagement (e.g., via interference) with a wall of a tilt plate defining a vertical slot for adjustment of the tilt position desired by a user (e.g., via the lever). During an impact such as a secondary impact, the column housing remains in a generally fixed position relative to a forward pivot mounting location (e.g., any forward translation is limited to a relatively small amount (e.g., about 20 mm or less or about 10 mm or less)).

The assemblies as described herein generally will include a tube that is operatively connected with a steering wheel (not shown), e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally hollow. The column tube may be generally cylindrical. The column tube may have a generally rounded cross-section. For example, the cross-section may be generally circular. The column tube may have a non-circular cross-section. For example, the column tube may have one or more straight portions in its cross-section. The column tube may have one or more angled portions in its cross-section. For example, the column tube may have a square or rectangular cross-section. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar, or both. As noted, the steering shaft may be supported for rotation at least in part by the column tube and have a longitudinal axis that may be generally coaxially aligned with the longitudinal axis of the column tube.

The column tube may include one or more openings along its length. Such openings may be adapted for receiving a fastener such as a rivet or a pin extending from another element of the assembly (e.g., a column tube pin of a breakaway bracket).

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing or both). For example, a bracket may include or be joined to one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. The tilt portion may be omitted. A mounting bracket may be employed separately from a structure defining a tilt portion. Examples of brackets that may be employed, in addition to the examples described herein, include those of U.S. Publication No. 2010/0300238 (the entirety of which is incorporated by reference for all purposes; see, e.g., description of bracket 20); U.S. Pat. No. 6,467,807, the entirety of which is incorporated by reference in its entirety for all purposes (see, e.g., description of brackets 6 and 7 and associated structure).

One or more brackets (e.g., tilt brackets), tilt plates, or a combination thereof may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure or may be joined directly or indirectly to one or more plates that at least partially flank at least a portion of the steering shaft support structure (e.g., the column tube). The bracket (e.g., tilt bracket) may include or be joined directly or indirectly to a pair of opposing side walls, an upper wall that is configured to attach to the vehicle (e.g., to a cross vehicle beam, an instrument panel, or other suitable structure), or a combination thereof. The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or a column tube, to a vehicle. An energy absorption device may be employed to limit forward travel of one or more components of the steering column assembly, such as the column tube, steering shaft, or both.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other feature adapted for manually actuating the subassembly. The subassembly may include at least one engagement member (e.g., a pin, such as a locking pin) that is brought into and out of engagement with the column tube or a structure secured thereto (e.g., a gear plate) for selectively locking the steering shaft into a position desired by a user (e.g., a fore or aft position). Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other). The subassembly may also include one or more spacers or dampers for softening impact between elements, allowing for a smoother adjustment, guiding deformation of one or more features in the assembly, or a combination thereof.

A column housing may be pivotally mounted at a pivot mounting location (e.g., a permanently fixed mounting) within the automotive vehicle. The pivot mounting location may, for example, be at or within about 20, about 30, about 40, or about 50 mm of a forward end of the column housing. The pivot mounting location may be on an underside of the column housing, on a top side of the column housing, or at some location in between the topside and the underside of the column housing. The column housing may at least partially surround the column tube. The column housing may have one or more projections or other structure to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

During an impact (such as a secondary impact), the structures of the present teaching may be configured to include a suitable combination of elements arranged in a manner so that a column tube, steering shaft, or both, is able to translate forward longitudinally relative to the column housing.

The teachings, in general, also envision the possible use of one or more energy absorption devices or assemblies. The energy absorption devices or assemblies may be a suitable device adapted to deform elastically, plastically, and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

Energy absorption or control may be provided by one or more elements breaking away from another element within the assembly in the event of an impact exceeding a threshold load. For example, a bracket secured to the column tube may break away or become disengaged from the column tube upon an impact exceeding a threshold load. The fasteners, such as rivets, or features extending from the bracket into an opening in the column tube, joining the components may shear, thereby allowing for the breakaway. Energy absorption or control may be provided by elements of the assembly engaging with each other. For example, a gear plate may have one or more features that engage with one or more features of an energy absorption plate. A gear plate may have one or more features that engage with a breakaway bracket.

The assembly herein may employ an energy absorption structure of the type or operating in a fashion described in U.S. Publication No. 2013/0233117, the entirety of which is incorporated by reference in its entirety herein for all purposes. For instance, the assembly herein may include at least one plastically deformable energy absorption device (e.g., a bend plate, a wire, or some other structure adapted to be carried at least partially by the column housing), wherein the energy absorption device, when employed, absorbs energy by plastic deformation during the secondary impact after the steering shaft support structure (e.g., column tube and steering shaft) starts to translate along the column housing. Any plastically deformable energy absorption device may thus limit the extent of longitudinal travel of the column tube, steering shaft, or both.

The present teachings contemplate an adjustment subassembly. The adjustment subassembly may include a tilt adjustment assembly, telescoping adjustment assembly, or both. one or more components of the adjustment subassembly may act to cause or aid in both tilt and telescoping adjustment. For example, by actuating a user operating device, such as a lever, this may lock and/or unlock both the telescoping adjustment assembly and the tilt adjustment assembly.

The assembly herein includes a tilt adjustment assembly. The assembly may include two or more tilt plates extending downwardly on opposing sides of the column tube, column housing, or both. The tilt plates may include one or more slots. The slots may be generally straight. The slots may have a curve. The slots may be generally vertical. The slots may be at an angle relative to the longitudinal axis of the steering column assembly. A tilt bolt or other elongated fastener may extend between the two tilt plates, and the tilt bolt may be received within the slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

To lock the assembly at a desired height or angle relative to the driver, the user operating device, such as a lever, may operate a locking system, such as a cam locking system. A rotational member may be located within either or both of the slots of the opposing tilt plates in the tilt adjustment assembly. The rotational member may be generally oblong or tear shaped, for example. The rotational member may engage (e.g., via teeth) with a wall defining the slot of the tilt plate when the lever or other user operating device is in a locked position. A spring may be keyed to the tilt bolt and attached to the rotational member so that when the lever is in a locked position, the spring pushes or rotates the rotational member so the teeth contact the tilt plate (e.g., at a wall defining the slot). Due to the shape of the rotational member, when the lever is in an unlocked position, the rotational member may disengage from the wall defining the slot of the tilt plate (and the teeth may be clear of the surface), and the rotational member and tilt bolt may be permitted to move freely upwardly or downwardly within the slot to adjust the height and angle of the steering wheel for the driver or user.

The present teachings also contemplate a telescope adjustment assembly. Features of the telescope adjustment assembly may also serve to absorb energy and/or break away during an impact, such as a secondary impact. Certain features of the telescope adjustment assembly may be part of the energy absorption assembly. Features of the telescope adjustment assembly, particularly those that serve to absorb energy or break away during an impact, are also useful in other positive lock assemblies or non-positive lock assemblies. Such use is also within the scope of the present teachings. While these features are beneficial in the exemplary positive lock structure as described herein, the present teachings are not limited to use in only the positive lock structure as described herein.

The telescope adjustment assembly and/or the energy absorption assembly may include a gear plate. The gear plate may be adapted to be operatively secured to another portion of the steering column assembly, such as the column tube, column housing, or both. The gear plate may function to provide an engagement area to allow for locking the telescope adjustment assembly. The gear plate may include one or more features for securing the gear plate to another portion of the steering column assembly. The gear plate may include one or more openings for receiving a fastener (such as a rivet, pin, screw, bolt, or the like), one or more projections or fasteners (e.g., integrated fasteners) for being received within an opening elsewhere in the assembly (e.g., an opening in a column tube), or both.

The gear plate may be generally planar. The gear plate may have one or more segments or surfaces that are generally planar (e.g., a surface facing away from the element to which it is secured, such as the surface facing away from the column tube).

The gear plate may include one or more side walls. The side walls may be generally transverse to the surface having the engagement area. The side walls may be adapted to extend toward an outer surface of the column tube. The side walls may provide stability to the gear plate, provide a desired orientation of the gear plate relative to the column tube, prevent rocking of the gear plate on the column tube, or a combination thereof.

The portion of the gear plate facing away from the column tube (or other element to which it is attached) may engage with a fastener or pin, such as a spring biased locking pin. This locking pin may be actuated by the user operating device, such as a lever, of the steering column assembly. For engagement with the locking pin, the gear plate may include a frictional surface, such as a toothed or textured surface. The gear plate may include a stepped surface. The gear plate may include a surface that is generally complementary in shape to the portion of the locking pin with which it engages to allow for a locking engagement between the structures. The gear plate may include one or more openings for receiving a portion of the locking pin.

The adjustment subassembly may include a locking pin or other member adapted to engage with the gear plate to provide a locking engagement (e.g., locking following telescoping adjustment). The locking pin may be pushed into and out of engagement with the gear plate, depending on whether the assembly is in a locking or unlocking position. For example, the locking pin may be pushed toward the gear plate upon locking of the lever, and the locking pin may be lifted away from the gear plate upon unlocking of the lever to allow for smooth telescope adjustment. The locking pin may be in a generally orthogonal relation to the longitudinal axis of the column tube, generally orthogonal to the longitudinal axis of the gear plate, or both.

The locking pin may have one or more features that allow it to engage with and/or contact one or more other elements of the assembly. At or near an end of the locking pin may be a plurality of teeth or other engagement features for engaging with the gear plate. Other engagement features may include a textured surface, a stepped surface, a complementary surface to the surface of the gear plate to which it contacts, an extension for being received within an opening, the like, or a combination thereof.

On an opposing end of the locking pin may be a head. The head may be received within another portion of the assembly, such as a preload plate. In the assembly, the head of the locking pin may extend toward the lever of the adjustment subassembly, away from the column tube, or both.

The locking pin may include a body portion. The body portion may serve to provide an area around which a spring (e.g., a return spring) may be located. The body portion may provide length to the locking pin (e.g., to make the pin the required length to serve its intended purpose). The body portion may serve to join the engagement feature (e.g., teeth) to another portion of locking pin (e.g., a lip).

The locking pin may include a lip. The lip may have a diameter or maximum width that is greater than that of the head, body portion, or both. The lip may provide one or more surfaces upon which pressure is applied when in a locked position, unlocked position, or both. This may enable engagement or disengagement of the locking pin from the gear plate. The preload plate may rest upon the lip of the locking pin when the head of the locking pin is received therein. The preload plate may push or preload the locking pin toward the gear plate via contact with the lip. When in an unlocked position, a spring (e.g., a return spring) located around the body of the locking pin may contact the lip on the opposing side to lift the locking pin clear of the gear plate to allow for smooth telescope operation.

The locking pin may have a generally circular cross section. The locking pin may have a generally rounded cross section. The locking pin may have one or more portions where the cross section includes one or more flat areas (e.g., shaped like a D). The locking pin may include one or more generally flat surfaces extending along at least a portion of the length of the locking pin. The generally flat surface may extend along the length of the body of the locking pin, along the entirety of the length of the locking pin, or both. The generally flat surface may reduce or eliminate rotation of the locking pin within the assembly to ensure proper alignment between the locking pin and the gear plate, such as the teeth of the locking pin and the toothed surface of the gear plate, for example.

The adjustment subassembly may include a preload plate. The preload plate may act as a spring, preloading the locking pin into the gear plate (e.g., in case of tooth-on-tooth engagement). The preload plate may include a portion that receives a portion of the locking pin. For example, the preload plate may include a pin opening for receiving the head of the locking pin. The preload plate may include a portion that contacts a contact portion of the user operating device, such as a lever.

The preload plate may include an outer segment. The preload plate may include an inner segment. The preload plate may include an arcuate portion that joins the inner segment and the outer segment. The arcuate portion may provide a certain flexibility to the preload plate to allow it to flex or act as a spring. The inner and outer segments may be generally parallel to each other when at rest or when no forces are acting upon it. The inner and outer segments may be urged toward each other (e.g., to form an angular relationship, as opposed to a parallel one) upon application of a certain force or pressure via the flexibility of the arcuate portion. The preload plate may have a generally C shape.

The outer segment may include one or more contact features for contacting the contact portion of the user operating device, such as a lever. For example, the outer segment may include one or more ridges, projections, or the like, for contacting the contact portion while in a locked position, unlocked position, or both.

The inner segment may include a pin opening for receiving the head of the locking pin. The pin opening may have a shape that is generally the same as the shape of the head to reduce rotation or movement of the locking pin within the opening. This may be further achieved by the presence of one or more tabs at the opening. The tabs may extend toward the outer segment and contact the head of the locking pin to further hold the locking pin in place (e.g., via friction, prevention of rocking or rotating, or both).

For telescoping adjustment, the portion of the gear plate facing away from the column tube may engage with a fastener, such as a spring-biased fastener, such as a locking pin, which may be actuated by the lever of the steering column assembly. The fastener may be inserted through an opening in the column housing, tilt plate, or both. The fastener may be positioned generally perpendicularly to the column tube. When the fastener, such as a spring-biased fastener, is pushed or when pressure is applied (i.e., the spring is compressed), the tip of the fastener may be caused to engage with the gear plate. For example, where the gear plate includes a toothed surface, these teeth may engage with a toothed end of a locking pin to provide locking engagement to prevent further movement of the column tube in a fore or aft direction. The pressure or compression of the spring-biased fastener may be provided by a portion of the lever or other user operating device. The pressure may be applied to a preload plate, which is distributed to the locking pin. As such, the lever or other user operating device may also allow the user or driver to control the telescoping adjustment of the steering column assembly in a fore and aft direction. The lever may include a ramp portion, or an angled segment facing the column tube and/or column housing. When the lever is in a locked position, the ramp portion may contact the preload plate (e.g., at the contact feature) or the head of the fastener, such as a spring-biased fastener, such as a locking pin, thereby pushing the pin toward the column tube. When the lever is in an unlocked position, the spring-biased fastener may be released, and as the spring returns to an uncompressed state, the tip or end of the fastener is removed from engagement with the gear plate (e.g., the toothed surface), and a user is free to pull or push the steering wheel to adjust the position telescopically. In a similar fashion, if the portion of the gear plate facing away from the column tube included a series of holes or openings, the fastener may have a corresponding shape to fit snugly within the hole or opening. The telescope assembly may instead include a slot or gap within which a fastener may be received. The fastener may have an oblong cross-section so that in one position the fastener can freely travel within the slot or gap and when rotated may prevent further movement (e.g., similarly to the rotational member and slot described with respect to the tilt adjustment herein).

The steering column assembly may include an energy absorption assembly. The energy absorption assembly may function to absorb energy, particularly upon an impact exceeding a threshold load. Energy may be absorbed by plastic deformation of a portion of the assembly. Energy may be absorbed by elastic deformation of a portion of the assembly. Energy may be absorbed by one or more portions of the assembly breaking away from another portion of the assembly. Energy may be absorbed by a combination thereof.

The energy absorption assembly may include any of a gear plate, an energy absorption plate, a breakaway bracket, or a combination thereof.

The gear plate may be as previously described. The gear plate may be generally planar. The gear plate may include one or more features for engaging with other elements within the steering column assembly. The gear plate may include features for engaging with a portion of an adjustment subassembly. A portion of the gear plate may engage with a locking pin. For example, a toothed or textured surface may engage with a complementarily toothed or textured surface of an end of the locking pin.

The gear plate may be made of a material having sufficient strength that it does not bend, break, or deform upon an impact exceeding a threshold load (e.g., about 500 N or more, about 6000 N or less, or any range in between). The gear plate may be formed of any suitable metal or metal alloy. Suitable materials may include aluminum, magnesium, zinc, and/or iron (e.g., steel).

The gear plate may include one or more features for engaging with other portions of the energy absorption assembly. At or near one end of the gear plate may be an area adapted to contact and/or connect to an energy absorption plate.

For example, at or near an end of the gear plate may be an opening for receiving a fastener to join the gear plate to an energy absorption plate. At the opening may be a collar or extended portion that surrounds the fastener. This may provide stability, maintain distance between the gear plate and a second segment of the energy absorption plate, reduce or prevent rocking of the gear plate, maintain position or orientation of the fastener, or a combination thereof. The collar or extended portion may act as a nut. The opening may be free of a collar or extended portion.

The gear plate may include one or more features for supporting a damper. A damper may be used as a stop within a telescoping assembly to prevent the column tube from translating too far in a fore or aft direction. The damper may act to maintain position of the gear plate, provide stability to the gear plate, maintain distance between the gear plate and a second segment of the energy absorption plate, reduce or prevent rocking of the gear plate, or a combination thereof. The damper may act to protect the gear plate. The damper may act to absorb energy within the energy absorption assembly. The damper may act to maintain position of the gear plate and/or prevent movement of the gear plate upon contact between the gear plate and a locking pin.

A damper may be located at one or more sides of the gear plate. For example, a damper may be located at one or both long edges of the gear plate. The damper may have one or more portions that are wider than other portions of the damper (e.g., forming a T shape). This may assist in providing a soft stop during movement of one or more components of the steering column assembly.

The damper may be polymeric. The damper may be formed of an elastic, resilient, and/or elastomeric material. The damper may be formed of plastic.

The damper may be one or more pieces. The damper may include two separate pieces located on opposing sides of the gear plate. The damper may be a single piece. The damper may have portions that are located on opposing sides of the gear plate with an adjoining portion located between the gear plate and the second surface of the energy absorption plate.

The energy absorption assembly may include a component for providing energy absorption. Such component may be a wire, a plate, a strip, or the like. For convenience, the component will be referred to herein as an energy absorption plate. The energy absorption plate may be capable of deforming upon an impact exceeding a threshold load. The energy absorption plate may have sufficient strength that it deforms without breaking. The energy absorption plate may, for example, be formed of plastic, metal, metal alloy, or a combination thereof. Suitable materials may include aluminum, magnesium, zinc, and/or iron (e.g., steel).

The energy absorption plate may have a first end and an opposing second end. The energy absorption plate may be situated such that the plate is bent, curved, or otherwise formed so the plate is in a non-linear and/or non-planar configuration (e.g., wherein the first end and the second end are not located in the same plane). A curved portion may be located between the first end and the second end. Between the first end and the curved portion may be a segment (e.g., a first segment) of the energy absorption plate. The segment may be generally planar. Between the second end and the curved portion may be a segment (e.g., a second segment) of the energy absorption plate. The segment may be generally planar.

The first segment and the second segment may be generally parallel to each other. The first segment and the second segment may be at an angle relative to each other. The angle formed between the first segment and the second segment may be about 45 degrees or less, about 30 degrees or less, or about 15 degrees or less.

The first segment of the energy absorption plate may have a length. The second segment of the energy absorption plate may have a length. The first segment may be shorter than the second segment. The ratio of length of the second segment to the length of the first segment may be about 2:1 or greater, about 3:1 or greater, about 4:1 or greater, or about 5:1 or greater. The ratio of length of the second segment to the length of the first segment may be about 15:1 or less, about 10:1 or less, or about 8:1 or less.

The energy absorption plate may be adapted to be secured to a portion of a gear plate at a junction. The energy absorption plate may include one or more features for attaching to the gear plate, such as an integrated fastener or an opening for receiving a fastener. The gear plate may include one or more features for attaching to the energy absorption plate, such as an integrated fastener or an opening for receiving a fastener. For example, the first segment of the energy absorption plate may attach to a portion of the gear plate, where both have aligned openings for a fastener to be located therebetween. It is contemplated that the fastener may penetrate only the first segment of the energy absorption plate and not the second segment of the energy absorption plate.

At one or more of the openings (e.g., an opening in the first segment of the energy absorption plate, an opening in the gear plate, or both), the opening may be a slot, rather than a circular opening. A slot may be incorporated at the junction to allow the gear plate to slip relative to the energy absorption plate. This may allow for any breakaway (e.g., of a breakaway bracket) to occur before the energy absorption plate is engaged. The breakaway may be completely decoupled from the energy absorption and/or energy absorption plate.

The gear plate and the energy absorption plate may be formed of different materials. The gear plate may be formed of a material that is stronger than the energy absorption plate. This may be advantageous in situations where the energy absorption plate is adapted to deform upon an impact exceeding a threshold load. It is contemplated that there may be situations where the gear plate is not desired to deform in the same or similar way.

The gear plate and energy absorption plate may be formed of the same material. The energy absorption plate may be integrally formed with the gear plate. The first end of the energy absorption plate may, for example, be at or near where a toothed portion begins, at or near where a damper is located on the gear plate, at or near where the gear plate (and/or gear plate with a damper) becomes wider than the energy absorption portion.

The energy absorption plate may include one or more features to allow the energy absorption plate to be secured to a column tube of the steering column assembly. The second segment of the energy absorption plate may be adapted to be positioned on the outer surface of the column tube. For example, the energy absorption plate (e.g., at the second segment) may include one or more openings for receiving a fastener. The openings may align with one or more openings in the column tube, such that a fastener may be received within both openings. Fasteners may include pins, clips, screws, rivets, or the like. For example, one or more rivets may be used to secure the energy absorption plate to the column tube. The rivets may be shear rivets. The rivets may be non-shear rivets.

It is contemplated that one or more slots may be located at an opening in the second segment of the energy absorption plate, at an opening in the column tube, or both. Slots may allow for breakaway to occur before the energy absorption plate is engaged. This may decouple the breakaway from the energy absorption and/or energy absorption plate.

The energy absorption assembly may include a portion adapted to break away from another portion of the steering column assembly. The breakaway may occur upon an impact exceeding a threshold load (e.g., about 500 N or more, about 6000 N or less, or any range or value therebetween). The portion adapted to break away may be a breakaway bracket. The breakaway bracket may be adapted to engage with the gear plate, the column tube of the steering column assembly, or both. The breakaway bracket may be formed of a material that is capable of breaking, shearing, or deforming in a desired manner such that the breakaway bracket may break away from another portion of the assembly, such as the column tube or the gear plate, upon an impact exceeding a threshold load. The breakaway bracket, or at least a portion thereof, may be made of a polymeric material. The breakaway bracket, or at least a portion thereof, may be made of a plastic material.

The breakaway bracket may have one or more features that allows the breakaway bracket to attach to the gear plate. The breakaway bracket may be positioned at or near the end of the gear plate opposite the end connected to or integrally formed with the energy absorption plate. The breakaway bracket may be at least partially positioned between the gear plate and the column tube. The breakaway bracket may act to connect the gear plate and the column tube. The breakaway bracket may act to provide sufficient distance between the gear plate and the column tube. The breakaway bracket may hold the opposing end of the gear plate from the energy absorption plate at a desired distance from the column tube (e.g., such that the gear plate is held generally parallel to the longitudinal axis of the column tube).

The breakaway bracket may be positioned between the column tube and the underside of the gear plate (e.g., the surface opposite the toothed surface). The gear plate may have an opening adapted to receive a portion of the breakaway bracket to secure the breakaway bracket to the gear plate. The gear plate and breakaway bracket may be attached, for example, via snap fit. The breakaway bracket may have an anchor (e.g., including wings or tabs) that is received within the opening and allow the breakaway bracket to be snapped into the opening of the gear plate.

Other attachment methods are also contemplated, such as friction fit, or use of fasteners, adhesives, or a combination thereof.

The breakaway bracket may have a structure with a slot adapted to receive an end of the gear plate therein or therethrough. The breakaway bracket may have a body that extends generally perpendicularly to the gear plate, the column tube, or both. The walls defining the slot may include one or more features or anchors, such as a barb, tab, or other projection, for resisting pull through of the gear plate from the breakaway bracket.

The breakaway bracket may include one or more features for attaching to the column tube. The breakaway bracket may include one or more features adapted to shear or break as the column tube translates forward upon an impact. Therefore, the breakaway bracket may remain in position, while the column tube continues to translate forward, due to the breaking away of the breakaway bracket from the column tube. Therefore, the features and/or breakaway bracket may be made of a material capable of securing the breakaway bracket to the column tube during normal operation but breaks away or shears upon an impact exceeding a threshold load.

The breakaway bracket may have a length dimension. The breakaway bracket may have a height dimension. The height dimension may vary across the length of the breakaway bracket. The length dimension may be larger than the highest height dimension of the breakaway bracket. The length dimension may be sufficiently large relative to the height dimension to promote and/or ensure the decoupling of the energy absorption plate from the column tube is due at least in part to, or at least primarily to, a shear failure in the breakaway bracket or one or more of the breakaway bracket attachments.

The breakaway bracket may include a column tube pin that extends from the breakaway bracket into an opening in the column tube. The column tube pin may be integrally formed with the breakaway bracket and may extend in a direction generally transverse to the longitudinal axis of the column tube. The column tube pin may be generally cylindrical. The column tube pin may have a shape that generally matches the opening in the column tube into which it will be received. The column tube pin may include one or more features to secure the pin within the opening (e.g., one or more features to snap the breakaway bracket onto the column tube, into the opening, or both). The column tube pin may be adapted to shear or break upon an impact exceeding a threshold load, such that the breakaway bracket becomes separated from the column tube as the column tube translates forward. The size of the column tube pin (e.g., diameter, length, shape, or a combination thereof) may be selected based on a predetermined threshold load causing the breakaway.

The breakaway bracket may include one or more openings for receiving a fastener. The opening may be generally aligned with an opening in the column tube, such that a fastener may be received within both openings to secure the breakaway bracket to the column tube. The fastener may be, for example, a rivet. The rivet may be a shear rivet. The shear rivet may shear upon an impact exceeding a threshold load, such that the breakaway bracket becomes separated from the column tube as the column tube translates forward. The shear rivet may allow for controlled breakaway loads.

The breakaway bracket may be free of a column tube pin. The breakaway bracket may be free of one or more openings or one or more fasteners. The breakaway bracket may have only one or more column tube pins or only one or more openings or one or more fasteners. The column tube may include any combination of one or more column tube pins, one or more openings, and one or more fasteners.

Upon an impact exceeding a threshold load, the column tube of the steering column may translate in a generally forward direction. During the impact exceeding a threshold load, the breakaway bracket may break away from the column tube. During the impact exceeding a threshold load, the breakaway bracket may break away from the gear plate. Breakaway may occur by a shear rivet shearing, a column tube pin breaking or shearing, a gear plate anchor breaking, or a combination thereof. The breakaway bracket may remain stationary as the column tube continues to translate forward in the event of a secondary impact where the load exceeds a threshold load.

It is contemplated that the breakaway bracket may be secured to the column tube using one or more fasteners, such as a non-shear rivet. The gear plate anchor may be arranged such that the breakaway bracket separates from the gear plate upon an impact load exceeding a threshold load.

The breakaway bracket may be packaged away from the energy absorption plate. For example, the breakaway bracket may be located at or near one end of the gear plate and the energy absorption plate may be located at the opposing end of the gear plate. This may allow the breakaway to be decoupled, partially or completely, from the energy absorption of the energy absorption plate. This may be due to the positional relationship of the breakaway bracket relative to the energy absorption plate. This may be due to the presence of one or more slots (e.g., at the junction between the gear plate and the energy absorption plate, where the energy absorption plate is joined to the column tube, or both) to allow for slip of the energy absorption plate relative to the gear plate, column tube, or both.

During or after the breakaway, the energy absorption plate may become engaged. As the column tube continues to translate forward, the energy absorption plate remains attached to the column tube and the gear plate. The gear plate remains stationary. Upon engagement of the energy absorption plate, the plate may be unwrapped or unraveled. During unwrapping or unraveling, the location of the curved portion of the energy absorption plate may change, the length of the second segment may shorten, or both.

Turning now to the figures, FIG. 1 illustrates a steering column assembly 10 having a forward end 12 and a rearward end 14. A column housing 18 is pivotally attached to the vehicle via one or more bracket structures 16, though other configurations and brackets for mounting are also contemplated. The steering column assembly 10 includes a steering shaft 22 at the rearward end 14, which is adapted for supporting a steering wheel (not shown). The steering shaft 22 is supported by a column tube 20, which are both supported by the column housing 18. The steering column assembly includes an adjustment subassembly 30 that enables movement of the column tube, column housing, or both, relative to each other and/or relative to the driver of the vehicle.

Figure 2:
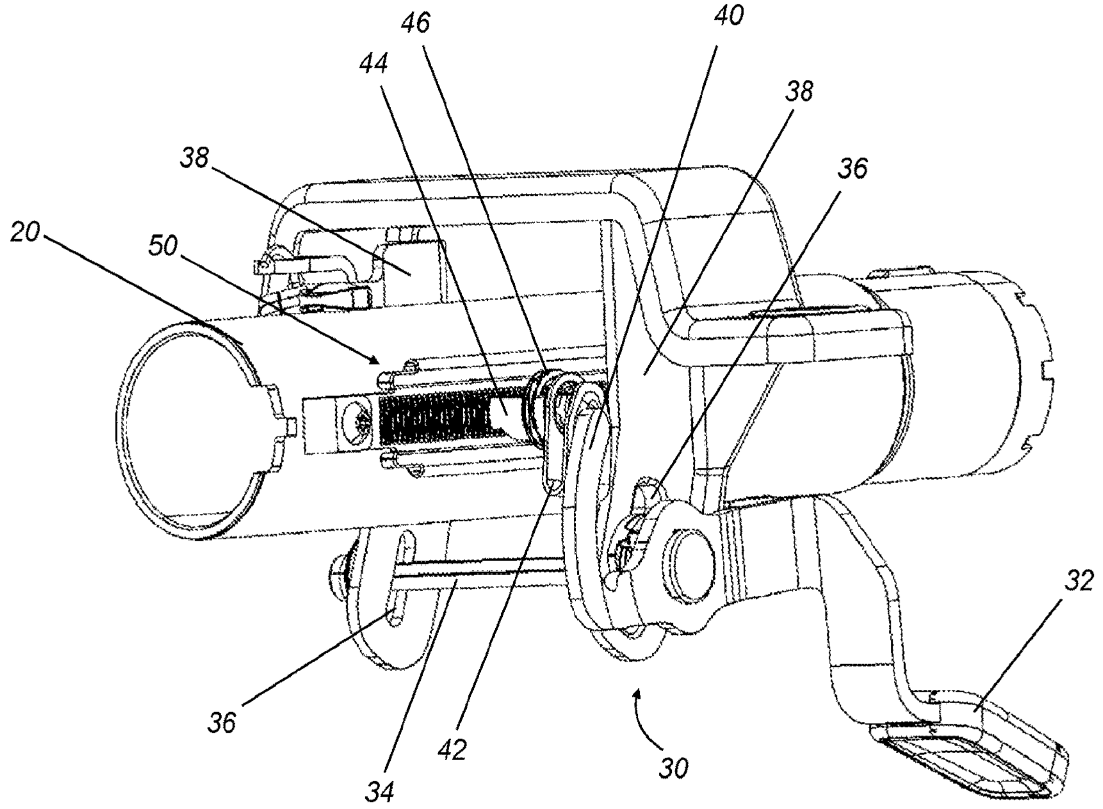
FIG. 2 is a perspective view of an adjustment subassembly of a steering column assembly in accordance with the present teachings.

FIG. 2 illustrates an exemplary adjustment subassembly 30, which includes a lever 32 that allows the user or driver to control the telescoping adjustment of the steering column assembly. The column tube 20 is movable relative to the column housing 18 (see FIG. 1), particularly in a fore and aft direction for telescoping adjustment. The steering shaft 22 (see FIG. 2) and the column tube 20 are adapted to be adjusted upwardly or downwardly relative to a driver via a tilt assembly that includes two parallel and downwardly depending tilt plates or side walls 38 that support and engage a tilt bolt 34. Adjustment of the steering shaft 22 and column tube 20 in a tilt and/or telescoping manner may be initiated by operating the lever 32, which engages and/or disengages adjustment mechanisms or locks and/or unlocks the mechanisms, allowing a driver to put the steering wheel in a desired position.

For clarity of illustration of the adjustment subassembly 30 in FIG. 2, the column housing is not shown. The position of the column tube 20 is permitted to be adjusted upwardly and downwardly relative to a driver or user of the vehicle via the tilt assembly, which includes the tilt bolt 34 supported on both ends by opposing side walls 38, each having a slot 36 to receive the tilt bolt 34 and optionally one or more locking members (e.g., a cam or rotational member). The angle of the column tube 20 can be adjusted manually via unlocking the lever 32 and moving the steering wheel (not shown) to the desired height or inclination. The tilt bolt 34 is permitted to move along the slot 36 during tilt adjustment and may lock in place upon locking the lever 32.

Upon locking and unlocking the lever 32, this causes a contact portion 40 of the lever to contact a preload plate 42. The contact portion 40 may have a ramp or angled surface that puts pressure on the preload plate 42 in a locked state and releases or puts less pressure on the preload plate in the unlocked position. The preload plate 42 engages with a locking pin 44. When the lever 32 is in a locked position, the locking pin 44 is pushed toward a portion of an energy absorption assembly 50, including a gear plate 60 (see FIG. 3), which is selectively attached to the column housing 20 through the telescope positive lock mechanism. The locking pin 44 engages with the gear plate 60, for example at a toothed surface 62 of the gear plate. When the lever 32 is in an unlocked position, a return spring 46 pushes the locking pin 44 away from the gear plate 60, thereby causing disengagement between the locking pin 44 and the gear plate 60.

Figure 3:
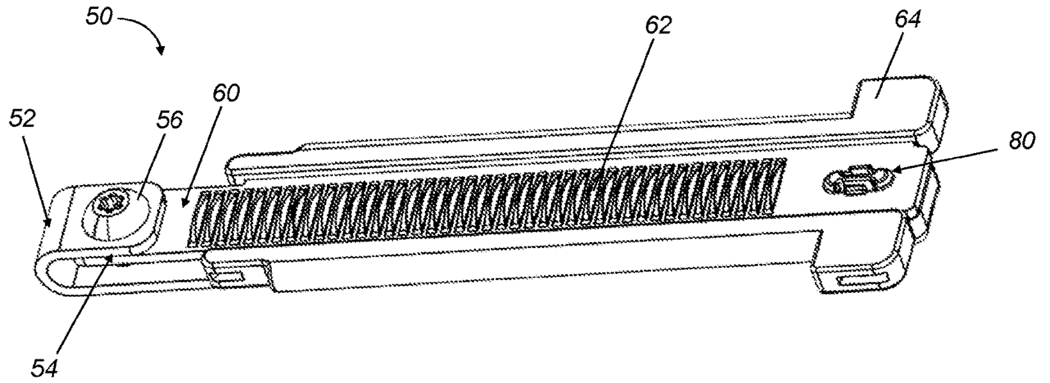
FIG. 3 is an exemplary energy absorption assembly in accordance with the present teachings.
Figure 4:
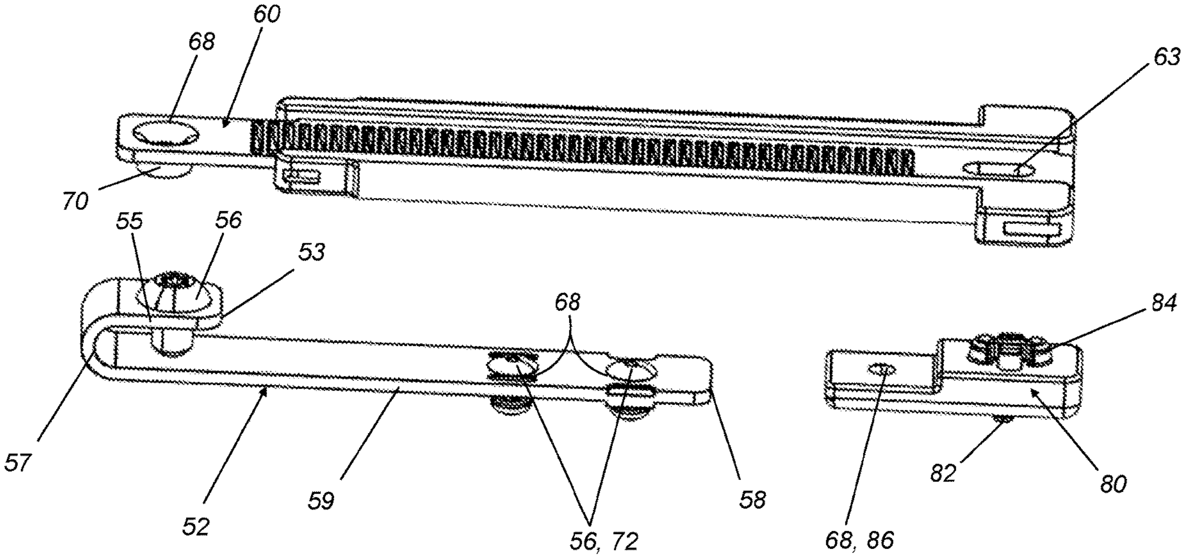
FIG. 4 is an exploded view of the energy absorption assembly of FIG. 3.

FIG. 3 illustrates an energy absorption assembly 50, including an energy absorption plate 52, a gear plate 60, and a breakaway bracket 80. FIG. 4 is an exploded view of the energy absorption assembly 50 of FIG. 3.

The energy absorption plate 52 includes a first end 53 and a second end 58, with a curved portion 57 therebetween. The curved portion as illustrated has a first segment 55 (between the first end 53 and the curved portion 57) and a second segment 59 (between the curved portion 57 and the second end 58) of the energy absorption plate 52 being generally parallel to each other, though other angles are also contemplated. The energy absorption plate has a fastener 56 penetrating at least a portion of the plate (e.g., at the first segment 55). The fastener may be integrally formed with the energy absorption plate 52 or may be separate. The portion of the energy absorption plate 52 adapted to contact a column tube of a steering column assembly includes one or more fastener openings 68. Received within the fastener openings is a fastener 56. As shown, the fastener 56 is a non-shear rivet 72 for attaching the energy absorption plate 52 to the column tube 20.

The gear plate 60 is joined to the energy absorption plate 52 at a junction 54. The gear plate includes a fastener opening 68. The fastener opening may receive the fastener 56 located at one end of the energy absorption plate 52. As illustrated, the fastener opening has a wall or collar 70 defining the fastener opening, illustrated as a downwardly extending tubular portion, though it is contemplated that other shapes are possible or the wall may be omitted. The gear plate 60 includes a toothed portion 62, which engages with the locking pin 44 to lock the steering column assembly in a particular telescoping orientation. The gear plate includes dampers 64 located on opposing sides of the gear plate along a portion of its length. The gear plate 60 as illustrated includes an anchor opening 63 located on an opposing end from the fastener opening 68. The anchor opening 63 receives a gear plate anchor 84 of a breakaway bracket 80.

While the gear plate and the energy absorption plate are illustrated as being two separate pieces joined together, it is also contemplated that these elements may be integrally formed in a single piece.

The breakaway bracket 80 is adapted to be secured to the gear plate 60 (via the gear plate anchor 84 engaging with the anchor opening 63 of the gear plate) and the column tube 20. The breakaway bracket includes a fastener opening 68 (shown as a shear rivet opening 86), which is adapted to receive a fastener, such as a shear rivet. On an opposing side of the breakaway bracket 80 from the gear plate anchor 84 is a column tube pin 82, which is adapted to engage with an opening in a column tube 20. In the event of an impact exceeding a threshold load, the column tube pin 82 may break, thereby allowing the breakaway bracket 80 to break away from the column tube.

Figure 5A:
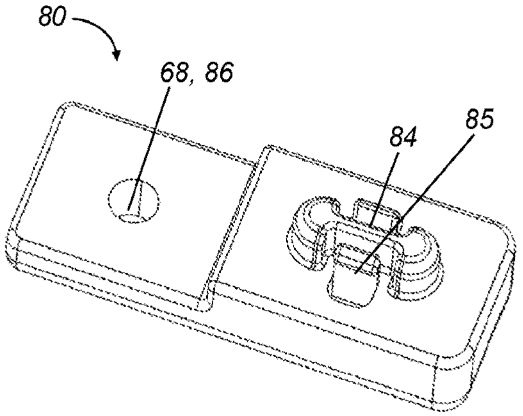
FIGS. 5A and 5B illustrate an exemplary breakaway bracket in accordance with the present teachings.
Figure 5B:
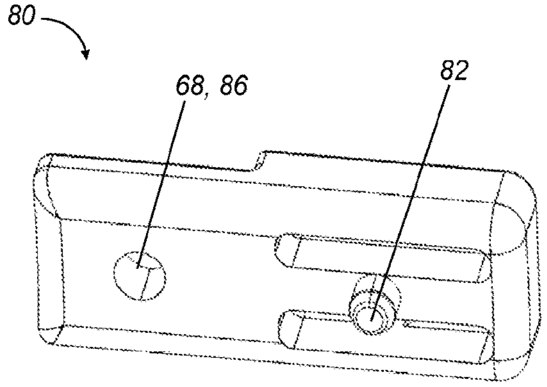

FIGS. 5A and 5B illustrate a top and bottom view of an exemplary breakaway bracket 80. The breakaway bracket 80 includes a fastener opening 68 penetrating the thickness of the breakaway bracket, capable of receiving a fastener to secure the breakaway bracket. The fastener may, for example, be a shear rivet. The fastener opening 68, therefore, would be a shear rivet opening 86.

As seen in FIG. 5A, a gear plate anchor 84 is positioned at the top face of the breakaway bracket 80. The gear plate anchor 84 is adapted to engage with an anchor opening 63 of the gear plate 60 (see FIG. 4). The gear plate anchor 84 is generally shaped to fit within the anchor opening 63. The shape of the gear plate anchor may resist pull-out when engaged or assembled. For example, as shown, the gear plate anchor 84 includes two curved or rounded portions that generally match the shape of the end boundaries of the slot of the anchor opening. Two generally opposing tabs or wings 85 engage with the side walls of the anchor opening. The coupling or interlock between the gear plate anchor 84 and the gear plate 60 may be by friction fit or snap fit, for example.

As seen in FIG. 5B, a column tube pin 82 extends from the lower face of the breakaway bracket 80. The column tube pin 82 is adapted to penetrate an opening in a column tube of a steering column assembly.

Figure 6:
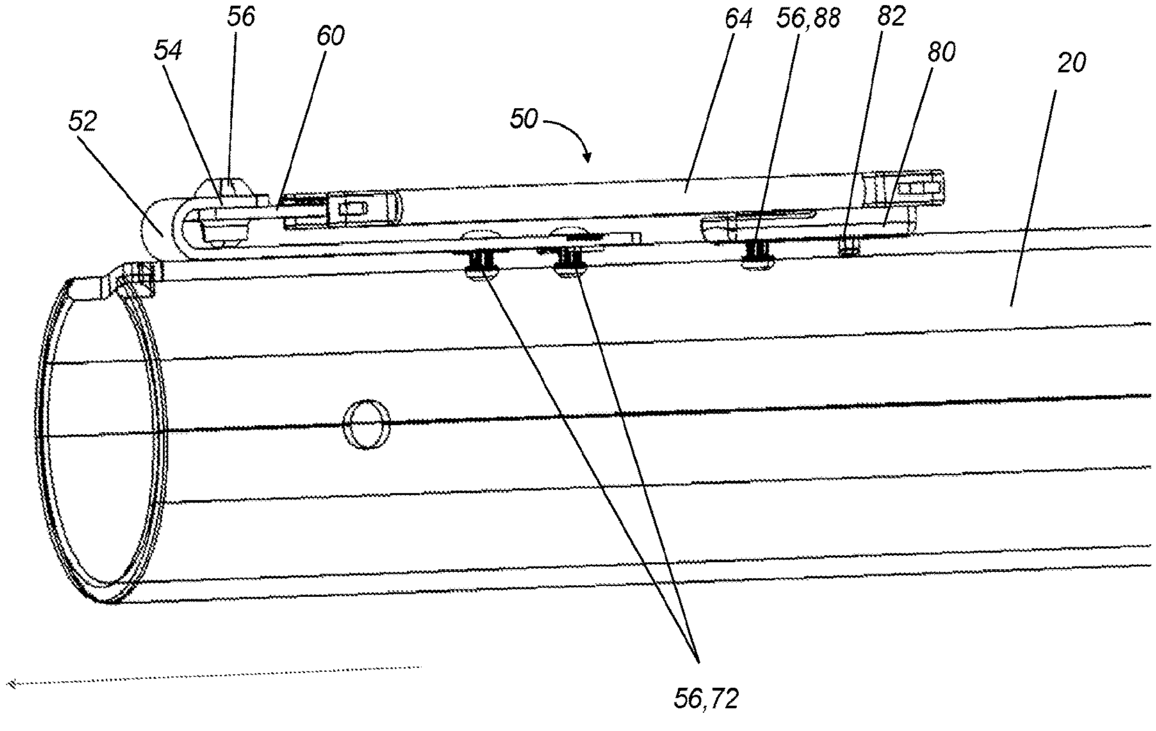
FIG. 6 illustrates an exemplary energy absorption assembly secured to a partially transparent column tube.

FIG. 6 illustrates an energy absorption assembly 50 secured to a column tube 20. The column tube is illustrated as generally transparent to show the fasteners securing the energy absorption assembly to the column tube. An energy absorption plate 52 is secured to the column tube 20 via fasteners 56, shown as non-shear rivets 72. On the opposing side of the curved portion of the energy absorption plate is a junction 54 between the energy absorption plate 52 and a gear plate 60. The energy absorption plate and the gear plate 60 are joined by a fastener 56. The gear plate includes a damper 64 located on the visible side in the figure. A breakaway bracket 80 joins the gear plate to the column tube 20 at the opposing end of the gear plate from the energy absorption plate. The breakaway bracket 80 includes a column tube pin 82 that penetrates an opening in the column tube. A fastener 56, illustrated as a shear rivet 88, joins the breakaway bracket 80 to the column tube 20.

The direction of the arrow (beneath the column tube) demonstrates the direction of column tube 20 movement during an impact exceeding a threshold load. Upon such impact, the shear rivet 88 may shear. The column tube pin 82 also shears in a crash. Once the shear rivet 88 and the column tube pin 82 shear, the breakaway bracket 80 will remain stationary as the column tube 20 continues to slide under it, unravelling, unwrapping, or shifting the location of the curved portion of the energy absorption plate 52. The energy absorption plate 52 remains fixed to the column tube 20 due to the non-shear rivets 72.

Slots may be incorporated at one or more fastener openings in the energy absorption assembly. For example, it is contemplated that slots may be incorporated in the energy absorption plate 52 at the fastener openings. Slots may ensure that the breakaway of the bracket occurs before the energy absorption plate is engaged. This would allow the breakaway to be completely decoupled from the energy absorption via energy absorption plate. In another example, a slot may be located at the junction between the gear plate and the energy absorption plate. Such slot would allow the gear plate to slip relative to the energy absorption plate, thereby decoupling the breakaway from the energy absorption via energy absorption plate.

Figure 7:
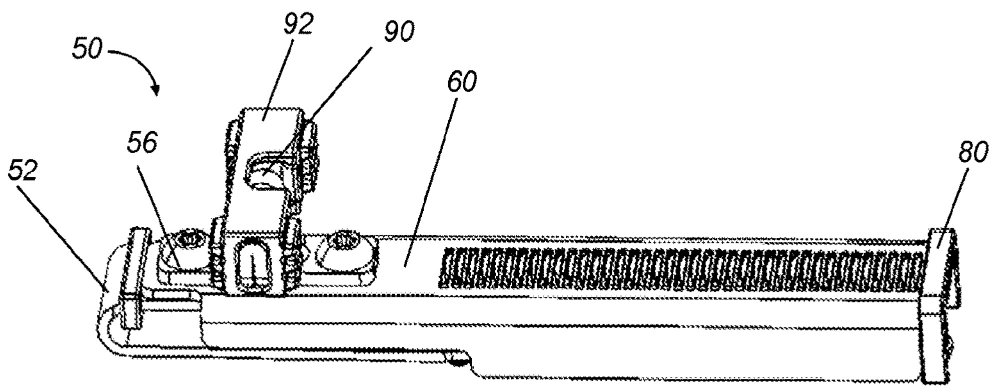
FIG. 7 illustrates an exemplary energy absorption assembly in accordance with the present teachings.

FIG. 7 illustrates an energy absorption assembly 50 with an energy absorption plate 52 coupled to a gear plate 60 via one or more fasteners 56. At the opposing end of the gear plate 60 is a breakaway bracket 80. Secured to the energy absorption plate 52 is a telescope stopper bracket 90, which supports a telescope stopper damper 92. The telescope stopper bracket 90 and the telescope stopper damper 92 are adapted to be located outside of a column housing. The telescope stopper bracket works within a slot in the column housing to define and limit the range of telescope adjustment. The telescope stopper damper reduces noise and/or impact force spikes due to impact when the end stops during telescope adjustment. While the telescope stopper bracket is shown separately, it is also contemplated that the telescope stopper bracket may be integrated into the gear plate or the energy absorption plate.

Figure 8:
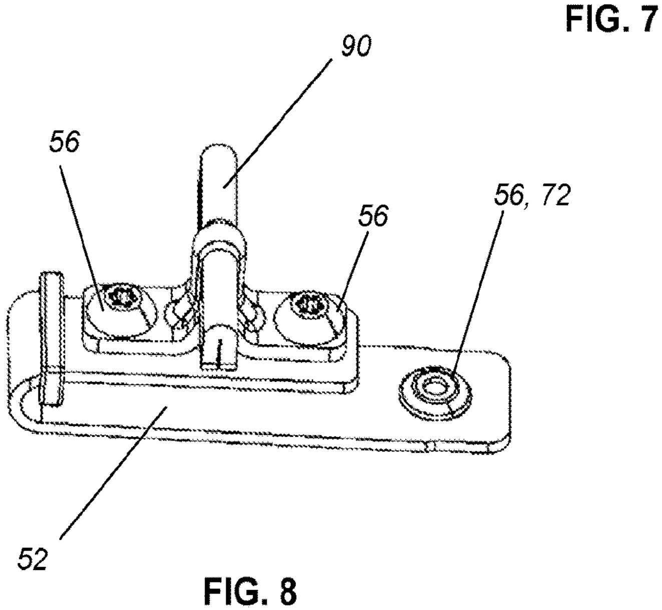
FIG. 8 illustrates an exemplary energy absorption plate and telescope stopper bracket in accordance with the present teachings.

FIG. 8 illustrates the energy absorption plate 52 of FIG. 7. A fastener 56, which may be a non-shear rivet 72 is located at one portion, such that the energy absorption plate 52 may be secured to a column tube of a steering column assembly. The telescope stopper bracket 90 is secured to the energy absorption plate at a portion on the opposing side of the curved portion of the energy absorption plate. The fasteners 56 on opposing sides of the telescope stopper bracket 90 secure the telescope stopper bracket (via a strip that extends over the telescope stopper bracket and is anchored on both sides) while also securing the energy absorption plate 52 to the gear plate 60 (see FIG. 7).

Figure 9:
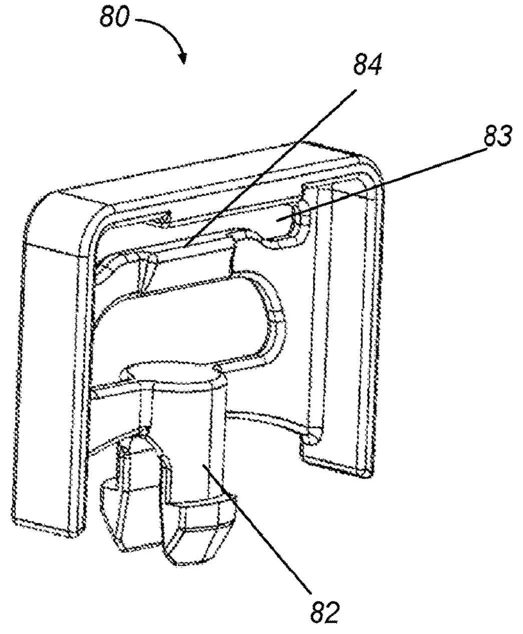
FIG. 9 illustrates an exemplary breakaway bracket in accordance with the present teachings.

FIG. 9 illustrates the breakaway bracket 80 of FIG. 7. The breakaway bracket 80 has a slot 83 for receiving a portion of the gear plate 60 (see FIG. 7). One or more gear plate anchor 84 features may engage with the gear plate to secure the gear plate within the breakaway bracket. The breakaway bracket 80 includes a column tube pin 82 that is adapted to be received within an opening in a column tube. The column tube pin 82 may frictionally engage or snap fit, for example, with the opening in the column tube to secure the breakaway bracket during normal operation. In the event of an impact exceeding a threshold load, the column tube pin 82 may shear, allowing the breakaway bracket 80 to break away from the column tube.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, the breakaway bracket may be secured to the column tube. Rather than or in addition to breaking away from the column tube, the breakaway bracket may break away from the gear plate. As another example, while a breakaway bracket is illustrated in the figures as having a column tube pin, alone or in combination with a rivet, it is contemplated that a column tube pin may be omitted. One or more shear rivets may be used, alone or in combination with one or more column tube pins. It is also contemplated that one or more rivets may be omitted. One or more column tube pins may be used, alone or in combination with one or more rivets.

As can be appreciated, variations in the above teachings may be employed. For example, it may be possible to make the steering wheel adjustment subassembly from multiple subassemblies. Rather than a toothed end of a pin engaging with a toothed portion of a gear plate, it is contemplated that a pin (which may be free of teeth) may be inserted into one of a series of openings along the length of the gear plate. It is also contemplated that toothed slots may be located elsewhere within the assembly. For example, instead of, or in addition to a cam or rotational member located within a slot of the tilt plate, the slot may be defined by a toothed opening that engages with a spring or a toothed cam or rotational member. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where translation of the column tube may be desirable for substantially reducing load that otherwise would be transferred to a vehicle operator.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference in their entireties for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

ELEMENT LIST

| | |
|---|---|
| 10 | Steering column assembly |
| 12 | Forward end |
| 14 | Rearward end |
| 16 | Bracket structures |
| 18 | Column housing |
| 20 | Column tube |
| 22 | Steering shaft |
| 30 | Adjustment subassembly |
| 32 | Lever |
| 34 | Tilt bolt |
| 36 | Slot |
| 38 | Side wall |
| 40 | Contact portion |
| 42 | Preload plate |
| 44 | Locking pin |
| 46 | Return spring |
| 50 | Energy absorption assembly |
| 52 | Energy absorption plate |
| 53 | First end |
| 54 | Junction (between energy absorption plate and gear plate) |
| 55 | First segment |
| 56 | Fastener |
| 57 | Curved portion |
| 58 | Second end |
| 59 | Second segment |
| 60 | Gear plate |
| 62 | Toothed surface |
| 63 | Anchor opening |
| 64 | Damper |
| 66 | Bracket opening |
| 68 | Fastener opening |
| 70 | Collar or wall defining fastener opening |
| 72 | Non-shear rivets |
| 80 | Breakaway bracket |
| 82 | Column tube pin |
| 83 | Slot |
| 84 | Gear plate anchor |
| 85 | Tabs |
| 86 | Shear rivet opening |
| 88 | Shear rivet |
| 90 | Telescope stopper bracket |
| 92 | Telescope stopper damper |

What is claimed is:

1. An energy absorption assembly for a steering column assembly comprising:

a. an energy absorption plate having a first end and a second end with a curved portion therebetween;

b. a gear plate adapted to engage and/or disengage with a locking mechanism; and c. a breakaway bracket including one or more gear plate anchors for engaging with a portion of the gear plate;

wherein the energy absorption plate is attached to and/or extending from the gear plate at or near an end of the gear plate;

wherein the breakaway bracket is attached to the gear plate at or near an opposing end of the gear plate; and wherein upon an impact exceeding a threshold load, the breakaway bracket is adapted to break away from a column tube of the steering column assembly while the energy absorption plate remains secured to the column tube.

2. The energy absorption assembly of claim 1, wherein the energy absorption plate is adapted to be coupled to the column tube of the steering column assembly via one or more fasteners.

3. The energy absorption assembly of claim 2, wherein the one or more fasteners are non-shear rivets.

4. The energy absorption assembly of claim 1, wherein the energy absorption plate and the gear plate are separate elements.

5. The energy absorption assembly of claim 1, wherein a fastener joins the energy absorption plate and the gear plate at a junction.

6. The energy absorption assembly of claim 5, wherein a slot is located at the junction between the gear plate and the energy absorption plate in the energy absorption plate, in the gear plate, or both.

7. The energy absorption assembly of claim 1, wherein the gear plate has a toothed surface for engaging with a locking pin of an adjustment subassembly of the steering column assembly.

8. The energy absorption assembly of claim 1, wherein the breakaway bracket is configured to couple the second end of the energy absorption plate to the column tube of the steering column assembly during normal operation.

9. The energy absorption assembly of claim 1, wherein the gear plate includes an opening for receiving a gear plate anchor of the breakaway bracket.

10. The energy absorption assembly of claim 1, wherein the breakaway bracket includes a column tube pin that is adapted to be received within an opening in the column tube of the steering column assembly.

11. The energy absorption assembly of claim 1, wherein the breakaway bracket includes a slot for receiving and engaging with a portion of a gear plate.

12. The energy absorption assembly of claim 1, wherein the energy absorption plate and the gear plate are integrally formed.

13. The energy absorption assembly of claim 1, wherein the breakaway bracket has a length dimension that is sufficiently large relative to a height dimension to promote decoupling of the energy absorption plate from the column tube primarily due to a shear failure in the breakaway bracket or one or more breakaway bracket attachments.

14. A steering column assembly comprising:

a. a column tube;

b. a steering shaft supported for rotation at least in part by the column tube;

c. a bracket for at least partially carrying the column tube;

d. an adjustment subassembly; and e. the energy absorption assembly of claim 1.

15. An energy absorption assembly for a steering column assembly comprising:

a. an energy absorption plate having a first end and a second end with a curved portion therebetween;

b. a gear plate adapted to engage and/or disengage with a locking mechanism; and c. a breakaway bracket including a year plate anchor for engaging with a portion of the gear plate;

wherein the energy absorption plate is attached to and/or extending from the gear plate at or near an end of the gear plate:

wherein the breakaway bracket is attached to the gear plate at or near an opposing end of the gear plate; and wherein the gear plate anchor engages with an opening in the gear plate via one or more wings or tabs.

16. The energy absorption assembly of claim 15, wherein upon an impact exceeding a threshold load, the breakaway bracket is adapted to break away from a column tube of the steering column assembly while the energy absorption plate remains secured to the column tube.

17. An assembly for a steering column assembly comprising:

a. an energy absorption assembly comprising:

an energy absorption plate having a first end and a second end with a curved portion therebetween;

a gear plate adapted to engage and/or disengage with a locking mechanism; and a breakaway bracket including one or more gear plate anchors for engaging with a portion of the gear plate;

wherein the energy absorption plate is attached to and/or extending from the gear plate at or near an end of the gear plate;

wherein the breakaway bracket is attached to the gear plate at or near an opposing end of the gear plate; and b. a column tube;

wherein upon an impact exceeding a threshold load, the breakaway bracket is adapted to break away from the column tube while the energy absorption plate remains secured to the column tube.

18. The assembly of claim 17, wherein the energy absorption plate is secured to the column tube by one or more non-shear rivets.

19. The assembly of claim 17, wherein:

i) the breakaway bracket includes a column tube pin extending from the breakaway bracket and received within the column tube;

ii) the breakaway bracket is secured to the column tube via one or more shear rivets; or both i) and ii).

20. The assembly of claim 19, wherein the column tube pin and/or the shear rivets shear to allow the breakaway bracket to break away from the column tube.

* * * * *